United States Patent
Brost et al.

(10) Patent No.: US 7,611,791 B2
(45) Date of Patent: Nov. 3, 2009

(54) SPIRALLY-WOUND FUEL CELL ASSEMBLY

(75) Inventors: Ron Brost, Dearborn, MI (US); William Schank, Howell, MI (US); James Waldecker, Farmington Hills, MI (US); Bruce Blakemore, Washtenaw, MI (US)

(73) Assignee: Ford Motor Company, Dearborn, MI (US)

( * ) Notice: Subject to any disclaimer, the term of this patent is extended or adjusted under 35 U.S.C. 154(b) by 666 days.

(21) Appl. No.: 11/281,215

(22) Filed: Nov. 16, 2005

(65) Prior Publication Data

US 2007/0111080 A1    May 17, 2007

(51) Int. Cl.
*H01M 8/04* (2006.01)
*H01M 8/10* (2006.01)
*H01M 8/24* (2006.01)

(52) U.S. Cl. .............................. 429/31; 429/32; 429/34; 429/35; 429/38

(58) Field of Classification Search ................... 429/34, 429/31, 32, 35, 38
See application file for complete search history.

(56) References Cited

U.S. PATENT DOCUMENTS

| | | | |
|---|---|---|---|
| 6,063,517 A | 5/2000 | Montemayor et al. | |
| 6,458,477 B1 * | 10/2002 | Hsu | 429/17 |
| 6,566,001 B2 | 5/2003 | Yosida et al. | |
| 7,005,207 B2 * | 2/2006 | Horiuchi et al. | 429/34 |
| 2004/0121208 A1 * | 6/2004 | James et al. | 429/31 |
| 2005/0014054 A1 * | 1/2005 | Champion | 429/34 |

* cited by examiner

*Primary Examiner*—Dah-Wei D Yuan
*Assistant Examiner*—Jacob Marks
(74) *Attorney, Agent, or Firm*—David Kelley, Esq.; Tung & Associates

(57) ABSTRACT

A spirally-wound fuel cell assembly is disclosed. The spirally-wound fuel cell assembly includes an enclosure. Multiple cell assemblies are disposed in electrical contact with each other and provided in the enclosure. Each of the cell assemblies has at least one membrane electrode assembly including a negative electrode, a positive electrode and a proton conductive membrane sandwiched between the negative electrode and the positive electrode. An oxidant channel is provided in each of the cell assemblies for receiving an oxidant gas. A fuel gas pathway is defined around the cell assemblies for receiving a fuel gas. A method of fabricating a fuel cell assembly is also disclosed.

18 Claims, 2 Drawing Sheets

SPIRALLY-WOUND FUEL CELL ASSEMBLY

FIELD OF THE INVENTION

The present invention relates to fuel cells. More particularly, the present invention relates to a spirally-wound fuel cell assembly which has a high operational efficiency and occupies a relatively small volume.

BACKGROUND OF THE INVENTION

Fuel cell technology potentially provides clean and efficient energy for stationary and traction applications. In order to be amenable to common usage, a fuel cell is best implemented in a form which provides reasonably high reaction efficiency near ambient temperatures, preferably below 100 degrees Celsius. However, the state-of-the-art of catalyst and membrane technology requires substantial working area between the electrodes to achieve commercially useful current at a reasonable potential at these temperatures. Current art commonly specifies large, flat electrodes to achieve the high surface area; however, this implementation requires precision-made plates, large rectangular seals, and complex reagent flow fields in order to function. These designs lead to a high-cost product with low reliability.

One known technique for improving the used surface area per unit volume of a fuel cell involves spirally winding the electrode assembly of the fuel cell. However, this technique does not include a mechanism to separate the fuel gas from the oxidizer, which is a necessary element for safe and efficient operation of the fuel cell. The technique presumes that the combustible fuel and oxidizer streams leading into the fuel cell are mixed prior to being introduced to a catalytic surface. Moreover, the technique does not afford a method for control over the fuel-oxidizer-inerts mixture, which changes dynamically throughout discharge.

One method used in the production of high surface area electrodes in commercially viable packages involves spirally winding the electrode elements around a core mandrel, which often also serves as one of the terminals. While this is a common and easily automated technique used in the commercial battery industry, the nature of fuel cells is such that active material immobilization (a presumption of wound electrodes) is not possible. Moreover, the typically low efficiency of the fuel cell reactions generates an additional requirement that the substantial quantity of waste heat due to polarization be removed.

Therefore, a spirally-wound fuel cell assembly which has high operational efficiency and occupies a relatively small volume of space is needed.

SUMMARY OF THE INVENTION

The present invention is generally directed to a spirally-wound fuel cell assembly. The spirally-wound fuel cell assembly includes an enclosure and multiple cell assemblies disposed in electrical contact with each other in the enclosure. Each of the cell assemblies has at least one membrane electrode assembly including a negative electrode, a positive electrode and a proton conductive membrane sandwiched between the negative electrode and the positive electrode. An oxidant channel is provided in each of the cell assemblies for receiving an oxidant gas. A fuel gas pathway is defined around the cell assemblies for receiving a fuel gas.

The present invention is further directed to a method of fabricating a fuel cell assembly. The method includes providing a mandrel tube for receiving a fuel gas, providing multiple cell assemblies each having at least one membrane electrode assembly and an oxidant channel defined by the membrane electrode assembly or assemblies for receiving an oxidant gas, forming a fuel gas pathway around the cell assemblies by winding the cell assemblies around the mandrel tube, and establishing fluid communication between the mandrel tube and the cell assemblies.

BRIEF DESCRIPTION OF THE DRAWINGS

The invention will now be described, by way of example, with reference to the accompanying drawings, in which.

DETAILED DESCRIPTION OF THE INVENTION

Figure 2:
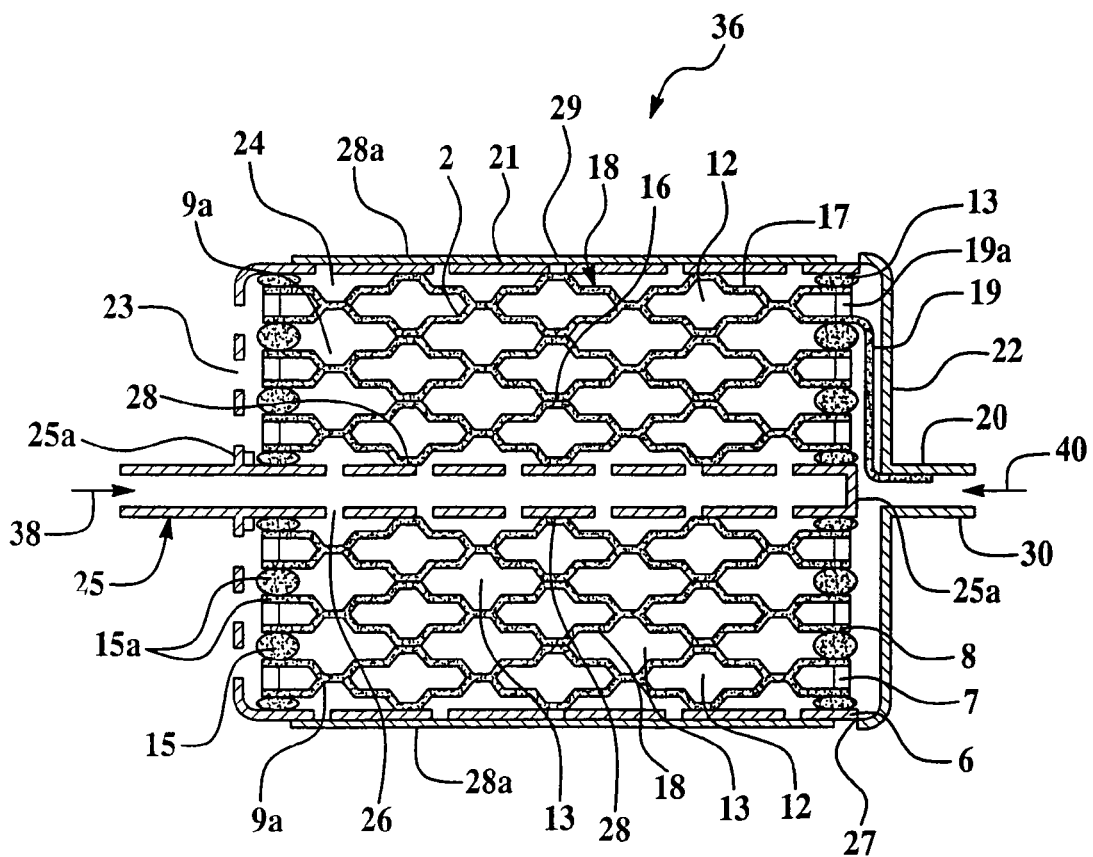
FIG. 2 is a longitudinal sectional view of the spirally-wound fuel cell assembly shown in FIG. 1.
Figure 3:
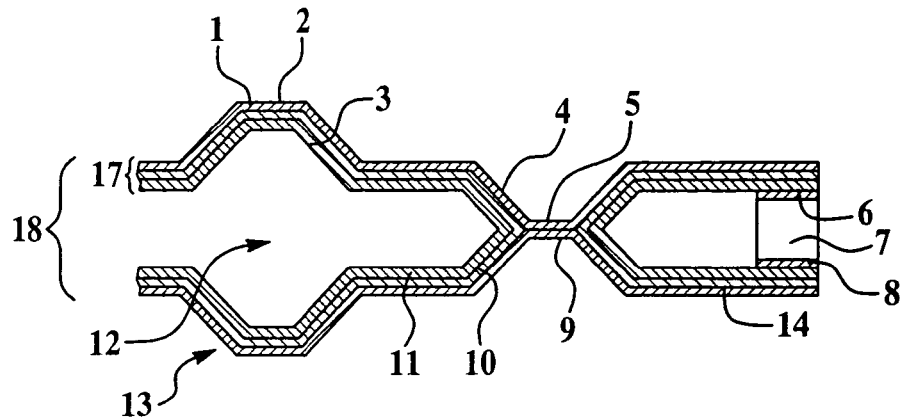
FIG. 3 is a sectional view of a portion of an electrode assembly component of the spirally-wound fuel cell assembly.
Figure 4:
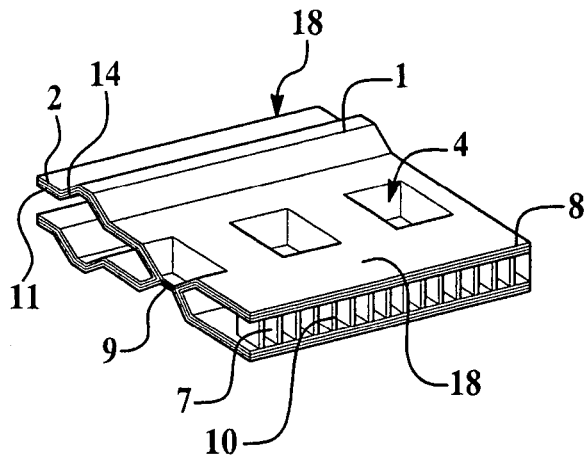
FIG. 4 is a side perspective view of a portion of the electrode assembly.
Figure 5:
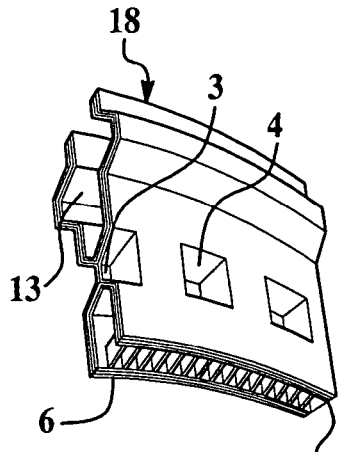
FIG. 5 is an edge perspective view of a portion of the electrode assembly.

Referring to the drawings, an illustrative embodiment of the spirally-wound fuel cell assembly according to the present invention is generally indicated by reference numeral 36. As shown in FIG. 2, the spirally-wound fuel cell assembly 36 includes multiple cell assemblies 18 which are physically and electrically connected to each other in a layered configuration and rolled in a generally cylindrical configuration. As shown in FIG. 3, each cell assembly 18 includes a pair of membrane electrode assemblies (MEAs) 17 which are connected to each other at multiple depressions 4 along the cell assembly 18, as further shown in FIGS. 4 and 5. As shown in FIG. 3, each MEA 17 includes a porous, chemically inert conductive layer 2 which serves as a negative electrode or cathode in the spirally-wound fuel cell assembly 36. The negative electrode 2 has a high aspect ratio and is coiled to form multiple trough surfaces 1 and depressions 4, as shown in FIGS. 3-5. A porous, chemically inert conductive layer 11, which serves as a positive electrode or anode in the spirally-wound fuel cell assembly 36, matches the outer bounds of the depressions 4 and is coined to nest with the trough surfaces 1 of the negative electrode 2.

A negative catalyst layer 3 is coated on the negative electrode 2. The negative catalyst layer 3 may be electrodeposited, deposited using chemical vapor deposition (CVD), painted or otherwise provided on the negative electrode 2. A positive catalyst layer 10 is coated on the positive electrode 11. The positive catalyst layer 10 may be electrodeposited, deposited using chemical vapor deposition (CVD), painted or otherwise provided on the positive electrode 11. A proton-conductive membrane 14 is sandwiched between the negative catalyst layer 3 on the negative electrode 2 and the positive catalyst layer 10 on the positive electrode 11. In formation of each MEA 17, the negative electrode 2, the negative catalyst layer 3, the proton-conductive membrane 14, the positive catalyst layer 10 and the positive electrode 11 are pressed and bonded together according to techniques which are known by those skilled in the art.

In each cell assembly 18, two of the MEAs 17 are juxtaposed in such a manner that the MEAs 17 are joined to each other at the depressions 4. Between the depressions 4, the MEAs 17 are spaced-apart from each other to form an oxidant channel 12. As shown in FIG. 3, at each depression 4, the MEAs 17 are joined to each other along an abutting surface 9, by any suitable technique such as welding or riveting, for example. As shown in FIG. 2, adjacent cell assemblies 18 are physically and electrically attached to each other in a layered configuration in the spirally-wound fuel cell assembly 36, at a physical/electrical interface 16 between the trough surfaces 1 of the adjacent cell assemblies 18. The depression surface 5 of each depression 4 may be punched through to form a gas flow opening (not shown) to permit the flow of a fuel gas directly from one side to the other side of each cell assembly 18. The short ends (not shown) of each cell assembly 18 are taper-pinched closed.

As shown in FIG. 3, at each long end of each cell assembly 18, a spacer 8, having a gas passage 7, is provided between the positive electrodes 11 of the MEAs 17 to secure the MEAs 17 in the cell assembly 18. Each spacer 8 forms a conductive interface 6, allows the passage of oxidant gases via the gas passage 7, and maintains the desired spacing between the MEAs 17. Each spacer 8 may be perforated and stamped metal, cast metal, a metalized porous ceramic or a high-porosity open-cell metal foam, for example.

As shown in FIG. 2, a cathode tube 19, which is a conductive metal strip, is inserted between the spacer 8 and the positive electrode 11 of each cell assembly 18 to serve as a positive current collection tab, with electrical contact being provided at an electrical contact 19a. The cathode tube 19 may be welded or otherwise attached to the surface of the positive electrode 11.

Figure 6:
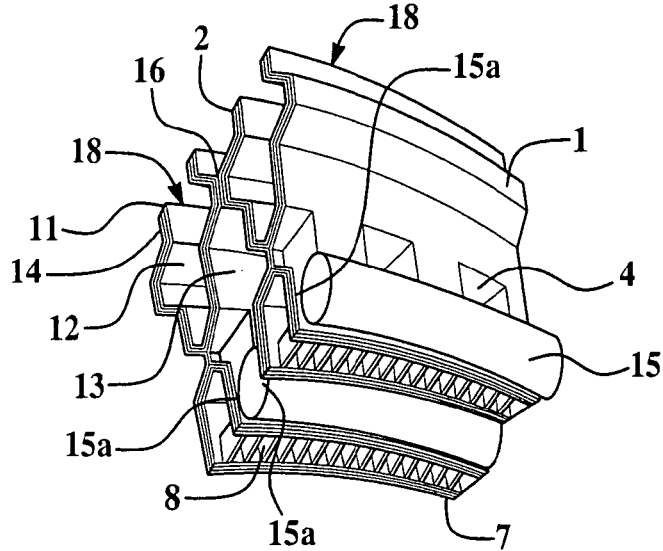
FIG. 6 is a perspective view of multiple electrode assemblies rolled and connected to each other in the spirally-wound fuel cell assembly.

As shown in FIGS. 2 and 6, in the spirally-wound fuel cell assembly 36, a non-conductive elastomer seal 15 is provided between the long ends of adjacent cell assemblies 18, with a sealing surface 15a provided between each elastomer seal 15 and each cell assembly 18. The connected cell assemblies 18 are rolled around a conductive, close-ended perforated mandrel tube 25, the open end of which is connected to a fuel source (not shown). Vent openings 26 are provided along the length of the mandrel tube 25 to permit the flow of a fuel gas from the interior to the exterior of the mandrel tube 25, thereby forming a fuel gas pathway 13 between and on the outsides of the physically and electrically connected cell assemblies 18. Optionally, a boss (not shown) may be added to the mandrel tube 25 to provide additional assembly robustness. The innermost cell assembly 18 is electrically connected to the mandrel tube 25 at multiple points of electrical contact 28. The electrical contacts 28 are maintained by either winding pressure or by application of a weld at the electrical contacts 28. The exterior surface of the mandrel tube 25 may be coated with an insulating polymer 25a to reduce the possibility of a short circuit.

Figure 1:
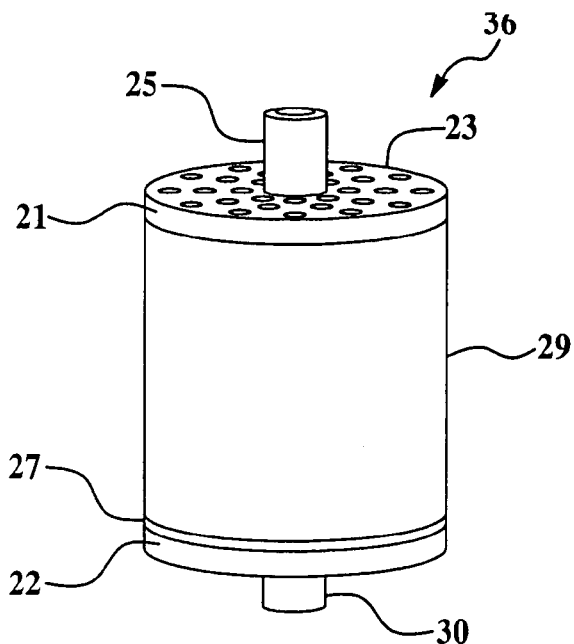
FIG. 1 is a perspective view of an illustrative embodiment of a spirally-wound fuel cell assembly according to the present invention.

As shown in FIGS. 1 and 2, the layered and rolled cell assemblies 18 are inserted into a cylindrical, open-ended enclosure 21, which may be a non-conductive material such as high-density polyethylene, for example. The closed negative end of the enclosure 21 accommodates the mandrel tube 25. The opposite, open end of the enclosure 21 is provided with an oxidizer delivery tube 30. Additionally, the enclosure 21 may be provided with oxidant exhaust openings 23 or may be fitted with a dedicated oxidant exhaust tube (not shown). As shown in FIG. 2, annular fuel vents 24 and a concentric flexible tube 29 may be provided on the exterior of the enclosure 21 to provide a one-way valve, and thus, facilitate purging or circulation of the fuel gas stream.

After insertion of the layered, rolled and connected cell assemblies 18 in the enclosure 21, the cathode tubes 19 are formed into a cathode tab bundle 20. As shown in FIG. 1, the oxidizer delivery tube 30 is typically fitted to a cap 22, which is preferably an insulating material, to close the open end of the enclosure 21. The cap 22 is attached to the open end of the enclosure 21 typically along an annular weld 27, thereby ensuring that the cathode tab bundle 20 is inserted through the interior of the oxidizer delivery tube 30. The cathode tab bundle 20 may be welded or otherwise attached to the interior of the delivery tube 30. As shown in FIG. 2, the enclosure 21 may be a conductive material such as nickel-coated mild steel to increase electrical connectivity via a friction fit 28a, provided that the cap 22 is formed of an insulating material or provided that the cap 22 and enclosure 21 are separated from each other by a gas-sealing and electrically-insulating material (not shown). The oxidizer delivery tube 30 is an electrically conductive material and is connected to an oxidizing gas source (not shown).

In use of the invention, the spirally-wound fuel cell assembly 36 is capable of automotive or stationary applications. The mandrel tube 25 is connected to a fuel gas source (not shown) which contains a fuel gas 38 such as hydrogen. The oxidizer delivery tube 30 is connected to an oxidant gas source (not shown) which contains an oxidant gas 40, such as oxygen, for example. The fuel gas 38 flows from the fuel gas source and through the mandrel tube 25 and the vent openings 26, respectively, where the fuel gas 38 contacts the negative electrode 2 (FIG. 3) on the innermost cell assembly 18. Some of the fuel gas 38 flows beyond the innermost cell assembly 18 progressively to the outer cell assemblies 18 in the spirally-wound fuel cell assembly 36, typically through the fuel gas openings (not shown) provided in the depression surfaces 5 (FIG. 3) of each cell assembly 18. Simultaneously, the oxidant gas 40 flows from the oxidant gas source (not shown), through the oxidizer delivery tube 30 and into the oxidant channels 12 of each cell assembly 18 through the spacer 8 of each cell assembly 18. Because the oxidant channels 12 of each cell assembly 18 are connected to each other around the depressions 4, the oxidant gas is able to flow freely throughout the oxidant channels 12 or each cell assembly 18.

At each cell assembly 18, the fuel gas 38 flows through the porous negative electrode 2 and contacts the negative catalyst layer 3 on the negative electrode 2. At the negative catalyst layer 3, the typically hydrogen fuel gas is split into protons and electrons. The electrons are distributed through an external circuit (not shown), which typically drives an electric motor (not shown), and return to the positive catalyst layer 10 on the positive electrode 11. The protons flow from the negative catalyst layer 3, through the proton conductive membrane 14 and to the positive catalyst layer 10.

At the positive catalyst layer 10, the electrons returning from the external circuit are joined with the protons from the proton conductive membrane 14 to form exhaust water. The unreacted oxidant gas 40 distributes the exhaust water from the oxidant channels 12, through the gas passages 7 at the exhaust end of the cell assemblies 18. The unreacted oxidant gas 40 and the exhaust water are discharged from the spirally-wound fuel cell assembly 36 through the oxidant exhaust openings 23 of the enclosure 21.

It will be appreciated by those skilled in the art that the spirally-wound fuel cell assembly 36 of the present invention is amenable to efficient fabrication since the fuel cell assembly operations include easily-automated steps. The cell component materials are well-known in the art and in conventional manufacturing disciplines. The spirally-wound fuel cell assembly incorporates a large electrode surface area in a relatively small volume. The spiral configuration of the cell assemblies are retained in a cylindrical enclosure, which has excellent shape retention under internal isostatic pressure.

The flow resistance for the oxidant gas feed is low due to massively parallel cross-current pathways. This provides a uniform and high oxidizer concentration and the ability to use associated inerts to cool the fuel cell. The oxidant gas pathway may be tuned for optimum water management through changes to the flow resistance of the spacers. Electrical pathways are maximized without an increase in the gas flow resistance. The construction of the cell assemblies allows for simple scale-up of voltage through a series connection of multiple cells or current through an increase in surface area of the electrodes. Kinetic resistance due to diffusion through ancillary structures (i.e. GDL) is minimized. If non-conductive active materials are used, a common manifold may be used to allow series voltage. The fuel cell concept is easily optimized through any combination of component dimensions.

While the preferred embodiments of the invention have been described above, it will be recognized and understood that various modifications can be made in the invention and the appended claims are intended to cover all such modifications which may fall within the spirit and scope of the invention.

What is claimed is:

1. A fuel cell assembly comprising:
an enclosure;
a plurality of cell assemblies disposed in physical and electrical contact with each other and provided in said enclosure, each of said cell assemblies having at least one membrane electrode assembly including a negative electrode, a positive electrode and a proton conductive membrane disposed between said negative electrode and said positive electrode, each of said cell assemblies comprising an inner portion comprising facing and spaced apart portions of said positive electrode and an outer portion comprising said negative electrode, said inner portion fluidly isolated from said outer portion;
an oxidant channel provided in fluid communication with said inner portion in each of said plurality of cell assemblies for receiving an oxidant gas; and
a fuel gas pathway defined around said outer portion of said plurality of cell assemblies for receiving a fuel gas.

2. The fuel cell assembly of claim 1 further comprising a plurality of oxidant exhaust openings provided in said enclosure and in fluid communication with said oxidant channel.

3. The fuel cell assembly of claim 1 further comprising an oxidizer delivery tube carried by said enclosure and provided in fluid communication with said oxidant channel.

4. The fuel cell assembly of claim 1 further comprising a plurality of seals provided between said cell assemblies.

5. The fuel cell assembly of claim 1 further comprising a mandrel tube provided in fluid communication with said fuel gas pathway for receiving the fuel gas and wherein said cell assemblies are wound around said mandrel tube in a generally cylindrical configuration.

6. The fuel cell assembly of claim 5 further comprising a plurality of vent openings provided in said mandrel tube and establishing fluid communication between said mandrel tube and said fuel gas pathway.

7. The fuel cell assembly of claim 1 further comprising a flexible tube carried by said enclosure.

8. The fuel cell assembly of claim 7 further comprising a plurality of fuel vents provided in said enclosure adjacent to said flexible tube.

9. A fuel cell assembly comprising:
a generally cylindrical enclosure;
a plurality of cell assemblies disposed in physical and electrical contact with each other and disposed in a generally cylindrical configuration in said enclosure, each of said cell assemblies having pairs of connected membrane electrode assemblies each including a negative electrode, a positive electrode and a proton conductive membrane disposed between said negative electrode and said positive electrode, each of said cell assemblies comprising an inner portion comprising facing and spaced apart positive electrode portions and an outer portion comprising said negative electrode, said inner portion fluidly isolated from said outer portion;
an oxidant channel provided in fluid communication with said inner portion in each of said plurality of cell assemblies for receiving an oxidant gas; and
a fuel gas pathway defined around said outer portion of said plurality of cell assemblies for receiving a fuel gas.

10. The fuel cell assembly of claim 9 wherein said positive electrode of each of said pair of connected membrane electrode assemblies faces said oxidant channel and said negative electrode of each of said pair of connected membrane electrode assemblies faces said fuel gas pathway.

11. The fuel cell assembly of claim 9 further comprising a plurality of trough surfaces and a plurality of depressions provided in each of said cell assemblies.

12. The fuel cell assembly of claim 11 wherein said cell assemblies are physically and electrically connected to each other at said plurality of trough surfaces.

13. The fuel cell assembly of claim 9 further comprising a plurality of oxidant exhaust openings provided in said enclosure and in fluid communication with said oxidant channel.

14. The fuel cell assembly of claim 9 further comprising an oxidizer delivery tube carried by said enclosure and provided in fluid communication with said oxidant channel.

15. The fuel cell assembly of claim 9 further comprising a mandrel tube provided in fluid communication with said fuel gas pathway for receiving the fuel gas and wherein said cell assemblies are wound around said mandrel tube in a generally cylindrical configuration.

16. The fuel cell assembly of claim 15 further comprising a plurality of vent openings provided in said mandrel tube and establishing fluid communication between said mandrel tube and said fuel gas pathway.

17. The fuel cell assembly of claim 1, wherein said plurality of cell assemblies are physically connected to one another through the negative electrode.

18. The fuel cell assembly of claim 9, wherein said plurality of cell assemblies are physically connected to one another through the negative electrode.

* * * * *